Jan. 7, 1964  G. S. WAGNER  3,116,943
QUICK DISCONNECT CRYOGENIC COUPLING
Filed April 18, 1961
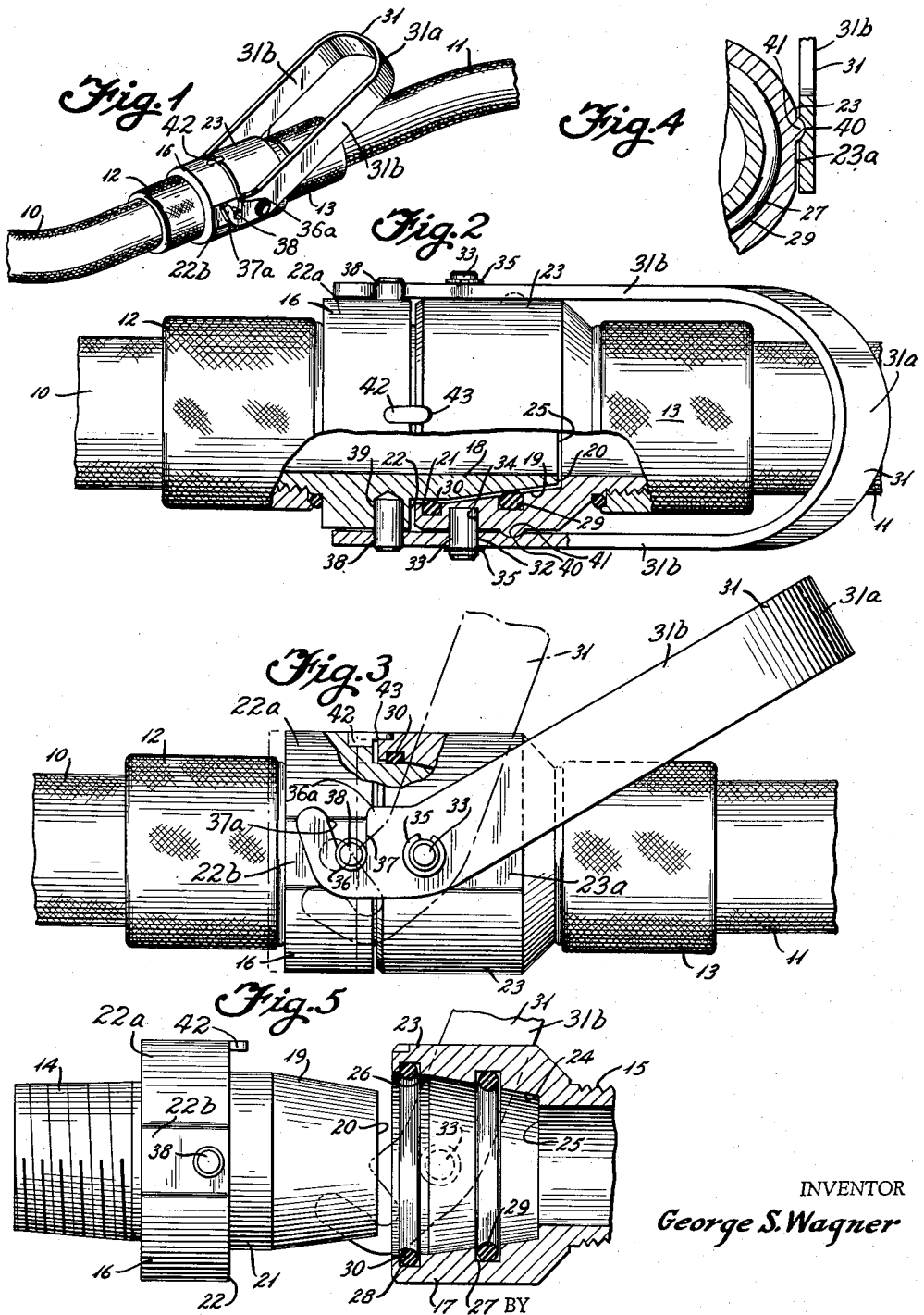
INVENTOR
George S. Wagner
ATTORNEY

United States Patent Office 3,116,943
Patented Jan. 7, 1964

3,116,943
QUICK DISCONNECT CRYOGENIC COUPLING
George S. Wagner, McLean, Va., assignor to Cryogenics, Inc., Stafford, Va., a corporation of Florida
Filed Apr. 18, 1961, Ser. No. 103,791
1 Claim. (Cl. 285—312)

This invention relates to the holding, transporting and use of commodities of various kinds, as well as commodities having various characteristics including those substances which are liquid under certain temperatures and pressures and gaseous under certain other temperatures and pressures.

The invention relates particularly to the handling of substances used for various purposes and which substances produce sub-freezing temperatures such as, for exampel, liquid oxygen/nitrogen and also it relates to equipment by which the transfer of such products is accomplished, although subject to such low temperature and proportionate pressure.

In the transfer of oxygen at a temperature of approximately 300° F. below freezing anything by which it comes in contact is reduced in temperature, and moisture in the form either of vapor or liquid readily solidifies or becomes ice, and in this manner objects are caused to stick together. Accordingly, a substantial problem is presented in the transferring of liquid oxygen/nitrogen or other fluent low temperature substance through pipe couplings, as parts of the coupling stick together and are difficult to couple and uncouple.

It is an object of the invention to overcome the difficulty enumerated and to provide a coupling which can be quickly coupled and uncoupled when in use and regardless of the low temperature of the medium with which used, with expenditure of minimum time and effort.

Another object of the invention is to provide a pipe coupling for use with matter of cryogenic temperature, for example, on the order of liquid oxygen/nitrogen or the like, which will provide a satisfactory seal over an extended period, and which can be coupled and uncoupled by the mere movement of a lever which not only will apply force in the coupling but also in the uncoupling of the device.

A further object of the invention is to provide a pipe coupling of metals or other materials which are poor conductors of heat, in which the parts are of such a construction that the engagement is solidly through the mere endwise movement, wherein the coupling is designed to take full advantage of ambient heat, and the coupling portions are exteriorly of the flow of liquid or with none of the moving parts exposed to such liquid flow.

A still further object of the invention is to provide a coupling for pipes conveying liquids at cryogenic temperatures including gently tapering telescopic tubular members with spaced annular gaskets therebetween and with a lever on the exterior pivoting to one end adapted to engage projections on the other so that when the lever swung about one pivot point the coupling will be forced together and when the lever is moved past a dead center portion it will engage the body of the coupling and be held in such position, and when moved in the opposite direction it will provide a cam action to force the members apart sufficiently to break any ice seal which may have been formed between them.

Other objects and advantages of the invention will be apparent from the following description in conjunction with the accompanying drawings wherein:

FIG. 1 is a perspective illustrating one application of the invention;

FIG. 2, a top plan view of the invention on an enlarged scale;

FIG. 3, an elevational view at right angles to that of FIG. 2;

FIG. 4, a modification of the pivot mounting, and

FIG. 5, a part sectional view of the coupling with the parts in spaced relation.

Briefly stated, the present invention is a pipe coupling which can be readily coupled or uncoupled with a minimum expenditure of time and effort regardless of the low temperature of the matter with which the coupling is used, such coupling being composed of a pair of coupling members of stainless steel or other poor conductive material having gently tapering telescopic portions one received within the other with spaced gaskets between them and with an external yoke pivoted to one and adapted to engage projections on the other and bind them in coupled relation, the yoke having a camming abutment which contacts the portion which is engaged for binding them together and thus forces them apart as the yoke is moved in the opposite direction.

With continued reference to the drawing, pipes or tubes 10 and 11 are adapted to have liquid oxygen/nitrogen or other low temperature substances pass therethrough. The tubes or pipes 10 and 11 have attached thereto internally threaded thimbles 12 and 13 which engage complementary threaded portions 14 and 15 of the coupling members 16 and 17.

The coupling member 16 includes an annular ring 22a and has a frusto-conical projection 18 with a gentle taper enlarging from an extremity 20 to a cylindrical portion 21 which terminates in a shoulder 22 of ring 22a. Ring 22a has diametrically opposed flat portions 22b from which extend pins 38 for a purpose to be more fully described hereinafter. The coupling member 17 has a receiving portion 23 with a frusto-conical inclined wall 24 extending from a shoulder 25 at its inner end to a cylindrical portion 26 at its outer end, and with spaced annular gasket grooves 27 and 28 in which are received annular gaskets 29 and 30.

The inclination of the surface 24 corresponds to that of the projection 19 and such surfaces 19 and 24 are spaced apart by the gaskets 29 and 30 leaving an air space. The end 20 of the projection 18 is disposed in slightly spaced relation to the shoulder 25 when the parts are assembled and consequently in order to break the seal very little force or effort is necessary, the gaskets 29 and 30 being resilient and being spaced apart in a manner that they retain the inclined surfaces parallel.

Accordingly, all that is necessary to couple and uncouple the parts is a direct movement thereof together or apart. In order to accomplish this result, a pivoted lever in the form of a yoke 31 having a bight 31a and legs 31b is provided, such yoke being pivoted upon diametrically opposed flattened portions 23a on opposite sides of one of the coupling members, as, for example, the coupling member 23, and to pivot such lever or yoke the legs 31b of the lever may be provided with an opening 32 in which is received a pin 33 mounted in the flattened portions 23a of a socket or recess 34 in the coupling member 23. The yoke lever can pivot about such diametrically pair of spaced pins 32 and is held thereon by means of a lock ring 35.

The end portions of the yoke 31 are provided with transverse receiving slots or openings 36 each having one substantially straight side wall 37 provided with a rounded shoulder 36a forming a cam surface, the other side wall 37a being inclined to provide an opposite cam surface. The slots 36 are adapted to receive diametrically opposed pins 38 which fit in openings 39 within the flattened side portions 22b of ring 22a of coupling 16. The distance between the pins 33 and the pins 38 at each side of the coupling is such that when the lever is in the position shown in FIGS. 1 and 3 the parts will be fully coupled without leakage. When the lever 31 is swung to the more upright dot-dash line position of FIG. 3, the parts of the coupling will have been broken apart due to the cam shoulder 36a having engaged the pins 38.

In order to maintain the yoke 31 in the locking position shown, the legs 31b thereof may have a recess 40 which is received in a projection 41 on the coupling 23.

A guide pin 42 is carried by shoulder 22 in substantially perpendicular relation to the axis of pins 38 and, when the parts are in proper aligned position for locking engagement, seats in an opening 43 in the adjacent face of receiving portion 23. The guide pin 42 and the opening 43 are, conjointly, so constituted and arranged, specifically with regard to the dimensions thereof, as to positively maintain the air space between the tapered projections 18 and 19 and to positively preclude excessive or over compression of the gaskets 29 and 30. To this end, the dimensions of the pin 42 and opening 43 are chosen, with respect to one another, so as to preclude an abutting of the extremity 20 against the shoulder 25: that is, the dimensions of the pin 42 and the opening 43, with respect to one another, are chosen so that, when interfitted with one another, the extremity 20 and shoulder 25 are maintained in spaced relation, thus positively providing the air space between the tapered projections 18 and 19.

It will be apparent from the foregoing that a coupling of the character indicated of stainless steel or other poor conductive material with the major area of the cooperating parts out of the line of flow of liquid or fluent material will not be sufficiently influenced to seriously interfere with the breaking apart or separation of the coupling member, and further, the coupling is so constructed that it will take full advantage of the ambient or surrounding heat.

It will be obvious to those skilled in the art that various changes may be made in the invention without departing from the spirit and scope thereof and, therefore, the invention is not limited by that which is illustrated in the drawing and described in the specification, but only as indicated in the accompanying claim.

What is claimed is:

A pipe coupling adapted for quick connection and disconnection at cryogenic temperatures, comprising, in combination, a male member of poor conductive material including an annular ring having flattened portions on opposite sides thereof, a pin extending radially of said ring from each flattened portion, said pins being circular and diametrically opposed, a cylindrical projection extending from said annular ring forming a shoulder, and a gently tapered frusto-conical portion extending from said cylindrical portion, and a female member of poor conductive material including a receiving ring having a cylindrical recess adjacent the abutting face of said shoulder, said cylindrical recess having an annular groove therein, a sealing gasket in said groove, said receiving ring being tapered to form a frusto-conical opening dimensioned to receive said frusto-conical projection of said male member, said frusto-conical opening having a groove therein at an intermediate point spaced from said groove in said cylindrical recess, a second sealing gasket in said last-mentioned groove, said gaskets being compressible only to an extent sufficient to space said cylindrical portion from said cylindrical recess, and said frusto-conical projection from said frusto-conical opening to provide an air space with contact between said male and female members being established only by said gaskets as a ring-like line encircling said cylindrical portion and a ring-like line encircling said frusto-conical projection, said receiving ring having diametrically opposed external flattened portions, pins extending from said last-mentioned flattened portions, a yoke comprised of a bight and leg portions and having openings in the leg portions thereof engaging over said last-mentioned pins, means securing said legs for pivotal movement on said last-mentioned pins, each leg having a slot therein and opening on one edge, said slots each being formed with an outwardly inclined side engageable with said first-mentioned pins and forming a cam surface whereby engagement of said first-mentioned pin in said slots draws said male and female members into sealing relation, the other side of each said slots being substantially straight and forming a rounded shoulder with the edge of its associated leg forming a cam which, when said yoke is rotated about its pivot pins, engage said first-mentioned pins to force said male member away from said female members to break to the ring-like frozen sealing relation of said gaskets with their associated cylindrical portion and frusto-conical projection to permit ready disassembly of the male and female members, said annular ring of said male member having an alignment pin extending therefrom, and a coacting alignment recess in the confronting edge of said receiving ring, the pin and recess being dimensionally so constituted and arranged as to positively provide and maintain said air space and preclude excessive compression of said gaskets.

References Cited in the file of this patent

UNITED STATES PATENTS

| | | |
|---|---|---|
| 602,863 | Marshall | Apr. 26, 1898 |
| 820,437 | Pehrson | May 15, 1906 |
| 1,104,955 | Bellows | July 28, 1914 |
| 1,220,868 | McSwain | Mar. 27, 1917 |
| 1,646,873 | Richards | Oct. 25, 1927 |
| 2,121,710 | Nielsen | June 21, 1938 |
| 2,453,480 | Williamson | Nov. 9, 1948 |
| 2,487,801 | Healy | Nov. 15, 1949 |
| 2,794,961 | Knight | June 4, 1957 |
| 2,812,958 | Rogers | Nov. 12, 1957 |